(12) United States Patent
Harfouche et al.

(10) Patent No.: US 11,818,471 B2
(45) Date of Patent: Nov. 14, 2023

(54) UNSCANNED OPTICAL INSPECTION SYSTEM USING A MICRO CAMERA ARRAY

(71) Applicant: Ramona Optics Inc., Durham, NC (US)

(72) Inventors: Mark Harfouche, Pasadena, CA (US); Roarke Horstmeyer, Durham, NC (US); Robert Horstmeyer, Durham, NC (US)

( * ) Notice: Subject to any disclaimer, the term of this patent is extended or adjusted under 35 U.S.C. 154(b) by 0 days.

(21) Appl. No.: 17/500,379

(22) Filed: Oct. 13, 2021

(65) Prior Publication Data

US 2022/0141393 A1    May 5, 2022

Related U.S. Application Data

(63) Continuation of application No. 16/954,960, filed as application No. PCT/US2018/065958 on Dec. 17, 2018, now Pat. No. 11,153,508.

(60) Provisional application No. 62/599,780, filed on Dec. 17, 2017.

(51) Int. Cl.
| | |
|---|---|
| *H04N 23/90* | (2023.01) |
| *G01B 11/245* | (2006.01) |
| *H04N 23/54* | (2023.01) |
| *H04N 23/695* | (2023.01) |

(52) U.S. Cl.
CPC ........... *H04N 23/90* (2023.01); *G01B 11/245* (2013.01); *H04N 23/54* (2023.01); *H04N 23/695* (2023.01)

(58) Field of Classification Search
CPC .. H04N 5/247; H04N 5/23299; H04N 5/2253; G01B 11/245; G01N 21/8806
See application file for complete search history.

(56) References Cited

U.S. PATENT DOCUMENTS

| | | | |
|---|---|---|---|
| 10,438,339 B1* | 10/2019 | Czarnota | G06T 7/0008 |
| 2009/0122304 A1* | 5/2009 | Jin | G01N 21/9503 356/237.4 |
| 2015/0091891 A1* | 4/2015 | Raheman | G06F 3/011 345/419 |
| 2015/0192529 A1* | 7/2015 | Sato | G01B 11/30 356/73 |
| 2016/0116419 A1* | 4/2016 | Pavani | H04N 7/181 348/87 |
| 2017/0016878 A1* | 1/2017 | Khismatullin | G01N 11/16 |
| 2018/0012344 A1* | 1/2018 | Jens | G06T 7/0004 |

* cited by examiner

*Primary Examiner* — Nasim N Nirjhar

(57) ABSTRACT

An arrangement of one or more micro cameras are used in conjunction with computer controlled illumination to create a high-throughput microscope able to operate without the need of expensive scanning stages. A single unit contains a plurality of sensors, lenses tiled in such a way to cover a significant fraction of the desired field of view in a digital single acquisition. Mechanical stages and patterned illumination can then be used in conjunction with the system to enhanced the imaged depth of field, or create an acquisition stack to enhance the information acquired. Multiple units can be combined to obtain images of a single sample from different angles. The absence of mechanical stages makes the imaging system ideal for use in scenarios that require the sample to be in a climate and/or environmentally controlled chamber.

18 Claims, 9 Drawing Sheets

Side view

UNSCANNED OPTICAL INSPECTION SYSTEM USING A MICRO CAMERA ARRAY

TECHNICAL FIELD

This invention relates primarily, but not exclusively, to Life Sciences and biological research tools and product inspection systems for the semiconductor, printed circuit board and electronics assembly industries. More particularly, the present invention relates to High Throughput (HTP) image scanners for multi well plates and scanning optical microscopes for life science research in live cell imaging, drug discovery and genetic research, scanning microscopes for digital pathology studies and automated defect inspection systems for bare and patterned wafers, displays, PCB's and other electronic parts and assemblies.

BACKGROUND ART

Electronics have become an important and ubiquitous part of modern society. Electronic products are based on semiconductor devices which are assembled with other devices on printed circuit boards to create systems that perform useful functions.

The process of making the semiconductor device and the process of assembling the devices into systems all require a number of inspection steps to ensure the devices are free from defects and the assembled product at the board level is operational. Identifying defects at key steps in the manufacturing process reduces overall cost by preventing additional processing on a damaged wafer where processing costs are very expensive. It also prevents defective systems that have been assembled incorrectly from reaching an end customer where they can fail and create costly repairs or returns. The ability to detect these defects using non-destructive electromagnetic radiation ensures that the inspection can be done throughout the manufacturing process without the destruction of the sample product being inspected.

The life sciences and biological research sectors utilize microscopes to image cell tissue for pathology and other reasons. In drug discovery they image vast quantities of materials with cell cultures or organisms using multi well plates (microplates or cell culture well plates) that have each well imaged in a sequential manner. This is a slow "step and repeat" process. These well plates commonly contain 96 wells but they can contain fewer wells or more. Some common size well plates have 1536 wells or 384 wells. Well plates can be approximately 5 inches by 3.3 inches in size. The science requires vast number of experiments and that requires imaging vast numbers of wells where each well can contain a cell culture and a separate reagent or mixture of reagents. Consequently, some companies acquire large numbers of HTP machines in order to generate the required data needed to draw effective conclusions.

While a generic microscope can be used to perform inspection of any device or product, the drug discovery industry, digital pathology industry, and the electronic industry operate at enormous throughput and scale. As time through the laboratory or the fabrication pipeline dictates the manufacturing costs and lead time for new product designs and for new drugs, it is imperative to reduce the time and cost associated for all inspection steps. This has led to highly automated and specialized inspection machines for each type of process. In the electronics sector, there are inspection tools that are optimized for inspecting bare wafers, others for inspecting partially completed or fully patterned wafers, others for inspecting packaged devices and others yet for inspecting the bare printed circuit board, the PCB with just solder paste and the completed PCB that is populated with devices and components. And in the biological sector there are specialized machines for pathology slide reading, well plate imaging and other imaging tasks that are highly automated.

These highly automated optical inspection systems typically include several subsystems. There are subsystems for handling the well plate or electronic device or board level product. Nearly all imaging solutions for optical inspection require mechanical subsystems with moving parts. These mechanical moving parts include sample stages, which move the well plate, electronic device or PCB into the inspection tool and then move it through the inspection tool and then remove it from the tool. Optical inspection systems also must include an optical subsystem that typically comprises a camera or several cameras combined with a lighting system and in the case of life sciences and biological research the lighting system may also have fluorescent filters. There is also typically a mechanical frame for holding the cameras, lighting and handling equipment, which can also have moving components to move the cameras or lighting into unique positions, which we will term an imaging system stage. In some inspection tools, the illumination system uses quick pulses of light to provide a "freeze frame" of the product being inspected. The use of "freeze frame" is performed to reduce blur from movement that can be unintentional such as vibration or from intentional design in systems that have continuous movement of the device being inspected as it moves under the imaging system. Also, there is software to analyze the output from the cameras.

The camera requirements are a function of the inspection to be done. For biological and HTP imaging requirements, the resolution may be 0.5 micrometers to several micrometers. For semiconductor wafers the resolution may be from a few micrometers to half a micrometer. However, wafer sizes range from 2 inches in diameter to the more common 8- and 12-inch diameters. For PCB inspection, imaging resolutions are typically on the order of 20 micrometers to 10 micrometers. While PCB's are in numerous shapes and sizes, many PCB inspection tools are designed to inspect PCB's of the size of 9 inches by 12 inches. Well plates often must be imaged at a resolution sufficient to observe individual cells, which is less than 5 micrometers. But, well plates are 8 cm×12 cm in size. From the above three examples, it is clear that billions of resolvable spots (i.e., computed by dividing the total required imaging area by the required resolution) are required to fully observe these large specimens and objects at high resolution. There are currently few lenses and digital image sensors that can capture this many resolvable spots, which thus presents a challenge to designing an imaging system that can capture all of this information without mechanically scanning either the sample via a sample stage or the imaging system via an imaging system stage.

To fully image the entire surface of the above large objects at high resolution, some inspection tools offer only 2D ("X-Y") planar inspection capability, while others also include a third dimension of motion, perpendicular to the optical axis (i.e., along "Z"). This third dimension of motion can help ensure that the captured images remain in focus. The ability to move the sample with the sample stage along "Z", and/or the imaging system via the imaging system stage along "Z", also allows current inspection systems to capture the vertical dimensions (or at least a portion of the vertical dimensions) for features on the product, for the ability to acquire 3D information about non-planar samples. Importantly, current inspection systems can adjust either the sample along "Z" and/or the imaging system along "Z" at each 2D scan position (that is, after moving either the sample along "X-Y" or the imaging system along "X-Y") to make sure that each unique snapshot of the specimen at each scan position remains in sharp focus. In other words, some current inspection systems offer the ability to refocus the sample during their step-and-scan imaging procedure to ensure that the sample remains in focus.

A detailed list of different imaging systems used in life science and industrial applications is outlined blow.

Currently, however, creating an unscanned optical inspection system that can be applied to both life sciences, industrial applications, and other large scale imaging tasks remains an open challenge. By applying a novel "microcamera array microscope" (MCAM) technology using the embodiments described below, this invention aims to achieve just that capability.

Single Shot Imaging Systems

L. Markwort et al discloses an inspection system that can image an entire item in a single exposure [Ref PTL1]. They describe using it to inspect 300 mm diameter sized semiconductor wafers. The optical train required to do this includes multiple lenses—with diameters greater than the item to be inspected—as well as numerous other large and small lenses. The resulting technical restrictions, including the cost, size weight, vibration damping requirements and the limitations of using a single image sensor in this approach also limit the commercial utility of the tool.

M. P. Asar describes a printed circuit board (PCB) inspection tool that uses a single fixed camera to image a stationary PCB target board [Ref PTL2]. The camera can attain a resolution of 120 dots per inch (a resolution of approximately 210 um). This is sufficient to read the part numbers and identify missing components and other major manufacturing flaws. While Asar notes the value of having a fixed camera image a fixed item, today, as electrical components are decreasing in size, this resolution may be insufficient to detect smaller flaws. The 120 dpi resolution limit is something that the proposed MCAM technology greatly improves upon, by offering approximately 10× or more higher resolution to see truly microscopic features.

Multiple Camera Imaging Systems

A. K. Kalnajs et al. describe early efforts to use multiple cameras in order to inspect PCB's [Ref PTL3]. These had limitations due to the large size of the cameras and required mirrors and camera mounting off the vertical axis. Kalnajs describes mounting staggered cameras vertically with beam splitters in order to position the cameras above the PCB. The PCB is then moved beneath the cameras and strobe lights are used to get freeze-frame images of a portion of the item for each camera and each strobing event.

J. B. Burnett describes a PCB inspection tool that uses multiple cameras and advances the illumination with a large ring of led lights to obtain lighting from many directions in order to avoid blind spots in the image caused by reflections from shiny surfaces [Ref PTL4]. The cameras are moved with an X-Y gantry like other systems in order to sequentially image the entire item.

D. W. Raymond et al. describes an inspection tool that uses multiple cameras and multiple illumination sources to image a complete item in a stepwise fashion [Ref PTL5]. The benefit of this invention being that the camera head assembly, comprised of 5 separate cameras as well as an illumination source, can do this in a single pass while using different wavelengths of light to illuminate the item. This is faster than making multiple passes of a camera and using different wavelengths of illumination (and/or location) on each pass across the item. This approach, however, still requires movement of the camera or the item and stitching the different fields of view to image the entire item.

J. K. Hong et al. refers to the use of an increased number of cameras in inspection tools, [Ref PTL6], but due to the differing optical trains involved in their approach, there is imprecise imaging of the entire item as the camera system field of view is moved across the item. Furthermore, there is no reasonably proposed algorithm to manage the aforementioned problem, so a beam splitter and two cameras are utilized to obtain two different images for each field of view that can then be combined in order to correct any errors resulting from the different optical trains. While this method uses multiple cameras, it still requires moving the item or the cameras themselves. And the use of beam splitters and twice the number of image sensors further increases the complexity and cost involved.

S. K. Case has developed two different optical inspection systems for printed circuit boards [Ref PTL7, Ref PTL8], which measure solder paste quality and electronic component placement and soldering on PCB's. Both systems rely on camera arrays and continuous movement of the item being imaged, while freeze frame illumination via short pulses of light is utilized for image capture.

C. E. Haugen et al. describe a system with multiple cameras to inspect a PCB [Ref PTL9]. Freeze frame illumination is used and the item is moved beneath stationary cameras to inspect the entire item in a stepwise method. This eliminates an expensive robotic motion system.

Horstmeyer et al. describe an imaging system where multiple cameras (upwards of 10 or more) are used in a single imaging system in conjunction with a patterned illumination system to obtain high resolution images of samples [Ref PTL10]. Here the camera array is restricted to imaging at a single plane without the ability to control the imaging plane of each camera individually. To overcome this limitation, this invention must move the sample via a sample stage, or the imaging system via an imaging system stage, to bring the imaged object into focus for each of the cameras within its array at different axial positions along "Z". Accordingly, it does not offer a scanless image solution to sharply resolution objects that have any appreciable height variations or any three-dimensional structure, which will cause the objects to appear out-of-focus in any number of the cameras within the array. The aforementioned invention also requires all adjacent cameras to have overlapping fields of view.

Positioning Systems

L. K Fisher et al. refer to the use of a gantry to move the camera within a system for sensing a three-dimensional topology of a circuit board [Ref PTL11].

In their patent describing a method for self-calibrating a positioning system for positioning an element in relation to a working space, P. Osterlund et al also discuss the associated complexity of controlling and calibrating such positioning systems [Ref PTL12]. These are the types of positioning systems that are eliminated by using the MCAM in inspection tools.

E. J. C. Bos describes precision positioning systems and their complexities [Ref PTL13], which are also avoided by using the MCAM.

J. K. Jeong et al describe using stepwise image capture to inspect a large item by moving it across a small field of view [Ref PTL14].

B. R. Spady et al describe a positioning system for a semiconductor wafer under inspection [Ref PTL15]. Once the wafer is properly positioned, it is retained in place and the imaging system moves in relative motion to the wafer to inspect the entire wafer in a stepwise manner.

J. Salafsky et al describe an inspections system for analyzing biological samples in a multi well plate by using a precision stage to move the samples beneath the imaging system [Ref PTL16].

Freeze Frame

E. P. Rudd et al describe a rapid firing flashlamp system to illuminate the item under inspection in rapid flashes that are timed to the camera operation [RefPTL17]. This permits the field of view to be "frozen" in the flash with less blur as the camera's field of view is moved across the entire item to be inspected.

Vibration Control

T. A. Skunes et al describe a system that captures images in less than 1 millisecond intervals to offset the effects of vibrations that interfere with determining the height of solder paste on a PCB using phase profilometry techniques [Ref PTL18].

D. Fishbaine et al describe a system to compensate for vibration of the inspected item by using strobed illumination [Ref PTL19]. Again, a stage is used to position the item for complete inspection.

SUMMARY OF INVENTION

Other and further aspects and features of the invention will be evident from reading the following detailed description of the preferred embodiments, which are intended to illustrate, not limit, the invention.

Technical Problem

Fundamental optics constrains the microscope such that a microscope that is built with a simple set of lenses will have an ever-smaller field-of-view as the imaging resolution is increased. This fundamental constraint, or trade-off between the imaging system resolution and field-of-view, limits the design of optical inspection systems. For clarity, as we look at a feature in a microscope and zoom in to enlarge the image to see finer details on the feature of interest; then the area or field-of-view gets smaller. This limitation can be overcome but at enormous cost by using large, expensive, heavy, complex lens systems, which attempt image over a large field-of-view at high resolution, but there is a natural limit to this effort.

For items that are large in size relative to the field of view of the camera (which is the most common situation by far), a subsystem is typically used to move the camera imaging system to take multiple images of the product, referred to above as an imaging system stage. Alternatively, one may choose to move the sample or item being inspected. This is called scanning by what we refer to above as the sample stage. The camera takes an image then the camera or the item is moved to the next location where the camera takes the next image and the camera or item is then moved again and again until the entire item has been imaged. The individual digital images can then be "stitched" into a composite by a computer to form a single image of the entire product with the required resolution. Moving the camera requires motion by the imaging system stage, which must be able to scan over the entire field of view of the sample to observe the entire sample. These motion subsystems have various industry names including, stages, aligners, and linear gantries, to name a few and are made by firms such as Newport Industries, PI (Physik International), Parker Hannifin, Aerotech and others. Alternatively, some tool manufacturers make their own motion subsystems. Due to the resolutions and geometries involved with the product and the camera, the imaging system stages that comprise a motion subsystem are required to have unique technical specifications that include high scanning resolution, high repeatability, motion in two and sometimes motion in three linear axes and some further with motion in all rotational axes. While these motion subsystems do not always have to move in the vertical direction, they must be designed in order to keep the object within the field of view of the camera as it is scanned. Other imaged samples have large variations in their height where the critical dimensions of an object may be located both above and below the imaging plane. For high resolution optical systems, this can pose very stringent requirements on the vertical repeatability of the scanning subsystem. In addition, the motion system must be very rigid and, in some cases, quite strong to support the weight of the camera and lighting. And the forces that are developed can be large as high speed throughput requires high acceleration and deceleration of the camera from location to location. Thus, the motion subsystem can be substantial in size and weight and this creates a need for a large and heavy supporting substructure that must be designed to minimize vibration and wobble. Controlling the motion of the imaging system stage within the motion subsystem requires a separate electronics control system (i.e., motion controller) which can cost as much as the motion subsystem. The cost of the motion subsystem and the motion controller can be substantial components in the overall cost of the inspection tool. As these are inherently mechanical components, they must be kept well lubricated and maintained throughout their operating life. The mechanical components may fail unpredictably and cause downtime for the operating facility that must run at large up-times to ensure profitability. The weight and size of the motion subsystem can define the overall size and weight of the inspection tool. Especially in semiconductor manufacturing facilities ("Fabs"), the cost of each square foot of space can be very large. So, small footprints on all tools is generally desirable in Fabs, and in most other manufacturing facilities. As an alternative to moving the camera assembly, motion systems can be used to move the sample or item being imaged, by a sample stage, to provide a similar resulting ability to capture image data at high resolution from across a large field-of-view. Here, the entire item or sample is again imaged in a stepwise process, by moving it beneath the one or more imaging cameras in a step and repeat process. For some inspection systems, (See US patents PTL7 and PLT8 for example), the item can be moved in a continuous manner beneath the camera subsystem and the illumination is timed with the camera imaging process to provide a "freeze frame" effect of distinct images of portions of the item as it moves continuously in front of the camera subsystem. These "freeze frame" images, which are digital images, are then "stitched" together using software to create an image of the complete item.

It is an objective of the present invention to provide a camera subsystem and image analysis subsystem for automated inspection systems in both life sciences and industrial applications that can replace the current technique of moving the sample being imaged via a sample stage, or moving the camera subsystem via an imaging system stage, in order to image and analyze the item without requiring any motion subsystems or motion controllers.

It is further an objective of the present invention to provide a subsystem for automated defect inspection systems of patterned wafers, whole wafers, sawn wafers, JEDEC trays, Auer boats, die in gel or waffle packs, MCMs, bare PCB's, solder masks, reticle masks, populated PCB's, connector boards, packaged chips, liquid crystal displays, alternative digital displays, photovoltaic panels, electronic sensors, etc.

It is further an objective of the present invention to provide a subsystem for use in high throughput tools for automated pathology, live cell imaging, multi-well culture plate imaging, freely moving in vivo organism imaging, etc.

It is further an objective of the present invention to provide a camera subsystem and analysis subsystem for an automated defect inspection system that is specifically designed to reduce costs, increase throughput, decrease the size, footprint and weight of the inspection tool and operate with different and/or multiple wavelengths such as is done in multispectral and/or hyperspectral Imaging.

It is further an objective of the present invention to provide a camera subsystem that consists of multiple individual imaging units, termed micro-cameras, that are each capable of focusing onto the surface of the item or sample independently, to enable detection of in-focus image information across non-planar, curved surfaces without requiring any sample or imaging system motion subsystems (i.e., without requiring a sample stage or imaging system stage)

It is further an objective of the present invention to provide a camera and analysis subsystem for automated optical inspection tools that has both 2D and 3D imaging capabilities which can be optimized for each individual product type that is inspected.

It is further an objective of the present invention to provide a camera subsystem for imaging in life sciences that is specifically designed to increase throughput and reduce costs.

It is further an objective of the present invention to provide a camera subsystem that captures images and allows the imagery to be manipulated computationally to derive useful information about the inspected item.

It is further an objective of the present invention to provide a camera subsystem that captures images and can be utilized within an Equipment Front End Module ("EFEM").

Solution to Problem

By utilizing a novel "micro-camera array microscope" (MCAM) imaging architecture, which is capable of acquiring gigapixels of high-resolution image data (less than 20 micrometer resolution, and down to 0.5 micrometer resolution) per second and capturing this image data over a large field of view (10's of centimeters in diameter), this invention is designed to create a stageless inspection system that can image the entirety of a large object without requiring movement of the object or the camera.

The proposed micro-camera array microscope consists of multiple digital image sensors, each with an associated imaging lens system. Each micro-camera forms and captures an image of the sample that may or may not overlap with the images formed and captured by adjacent cameras. The set of all micro-cameras forms the camera subsystem of the proposed invention.

The image created by the micro-camera array does not have to be contiguous or obtained from a single imaged plane. In fact, for objects with a known thickness profile, it may be advantageous to align the lenses to different planes of focus. The lenses and sensors may also be positioned at different angles to focus in on the object at the desired angle.

Together, the area imaged by the cameras is a substantial fraction of the object that is to be inspected in at least 2 dimensions (25%-100% of the object will be inspected within a single snapshot by the micro camera without requiring any appreciable scanning motion), avoiding the need for costly translation stages that can precisely move the camera or sample across the entire field of view to be inspected (often as large as 300 mm in diameter or larger).

In this configuration, the field of view of the micro-camera array forms a substantial fraction of the object that is to be inspected. This eliminates the need for the sample or the imaging system to be scanned with precision over the entire sample. Rather, these bulky and expensive motion subsystems may be replaced with smaller motion subsystems used to fine-tune the position of the micro-camera array or the sample itself. Unlike other motion subsystems that must provide travel over the entire field of view, these subsystems are only required to travel a few centimeters or less (at most the distance between adjacent cameras), as compared to the 10 s of centimeters of travel required by other imagers.

To accommodate for the case where the entire sample might not be in focus across each and every micro-camera within the micro-camera array, which might be the case for the majority of items or specimens of interest and presents a challenge to such a parallelized imaging approach, the present invention takes advantage of one or more of three possible "refocusing strategies" to minimize the effects of sample defocus. First, each micro-camera within the array may utilize a refocusing element on the image sensor plane, which can move the image sensor by a small amount (<3 mm) to bring different image planes into focus. Second, a refocusable lens element may be used to provide a similar functionality. And third, multiple acquisitions of the sample might be taken, each with slightly different imaging parameters, such as different illumination settings. Example samples that will require such refocusing include bulk components placed on a PCB, or biological specimens in well plates located at various heights, or curved surfaces that require inspection, or volumes of liquid in which the specimens of interest exist.

After the acquisition of the optical measurements, the invention then allows image processing of all acquired image data to be done on-line or off-line by a computer, which comprises the image analysis subsystem of the proposed invention.

In an on-line configuration, the inspection subsystem would analyze the acquired images and extract relevant features while discarding extraneous information and thereby reducing the amount of necessary storage space. In an off-line configuration, the raw data would be stored on a server for detailed analysis at a later time.

While the storage requirements are larger, off-line analysis may enable more detailed analysis to be performed on a smaller subset of the images. The final imaging system may choose to use a combination of the two approaches whereby a fraction of images are analyzed in real time and another fraction (potentially overlapping) are stored for off-line analysis.

There are many benefits to be gained in cost reduction, speed and throughput, floor space savings, image quality and system design flexibility from using an MCAM to create a stageless product inspection system. The MCAM does not require the large and expensive optical train for single shot inspection systems. It also eliminates the need for expensive stages and complex strobing illumination timed with the cameras since the object does not need to be moved over the entire field of view to be inspected. In addition, it reduces the size of the inspection system and the need for vibration isolation hardware such that inspection can be accomplished in small volumes, such as EFEM's or climate-controlled incubators, where inspection previously would be prohibitive.

Advantageous Effects of Invention

The current invention leverages the technology and market trends in digital cameras and computers where digital image sensor costs have dropped exponentially as production scales have ramped for digital cameras used in consumer products. Small, low power, high pixel density image sensors are becoming increasingly common in cellphones, laptops, and in-home appliances. The invention outlined makes use of the same, or similar sensors as the ones included in consumer electronics to substantially drive down the cost of inspection equipment. However, it is clearly the intent of this patent to also claim the use of specialized imagers as there may be products that require special imaging capabilities such as very high speed, low light or depth readout from time of flight measurement. In such cases, special imagers may be used, but in most scenarios more common imagers—typically produced in high volumes for end use in consumer electronic products—will suffice.

Computational bandwidth and networking costs also continue to plummet. These trends are expected to continue such that the use of a large number of cameras, which would have been economically impractical a few years ago, is now quite reasonable and will only get less costly with time. Similarly, the computational bandwidth required to manage Gigapixel images and the computational power are decreasing with the rise of computationally efficient image processing algorithms. As detailed above, the image processing in the MCAM stageless inspection system can be done on-line or off-line depending on the needs of the customer.

By eliminating the large distance motion subsystem numerous benefits can be obtained. These include cost reduction and reduction in system weight and footprint. Also, performance is increased in higher throughput, as a single "snapshot" can be taken of the product and the entire product is imaged at once rather than having to move the camera multiple times for taking multiple individual images.

Additionally, multi-camera arrays offer other unique advantages. These include a large depth of focus than single-lens systems, and most critically enable each individual micro-camera to be brought into focus on a separate plane, to ensure that curved samples can be captured in sharp focus across the entire sample area without requiring any motion subsystems (i.e., a sample stage or imaging system stage), via one or more of the three "refocusing strategies" outlined above. The present invention's "refocusing strategies" also enable 3D imaging capabilities, by acquiring one or more images from each camera within the array under different imaging parameters (i.e., different refocusing strategy settings). For 3D imaging, the MCAM can be configured, if the operator chooses to do so, to extract the depth information within the imaged area with one image per micro-cameras within the array. This can be done by ensuring that adjacent micro-cameras have partially overlapping fields of view, such that each point on the sample is imaged by at least two micro-cameras within the array. The sample, as it appears in each micro-camera, will appear at slightly different spatially offset locations, due to the differences in the perspective of each micro-camera, following standard principles from stereoscopic imaging. While difficult to discern with the human eye, computational algorithms can be used to combine the images in the overlapping regions to extract 3D information within the depth of field of the camera. The MCAM system may choose to detect defects in the fabricated PCBs either by looking at the RAW images from the two separate sensors, or by using the combined image that was reconstructed to contain the 3D information. Not all adjacent micro-cameras are required to have overlapping fields of view. For example, a micro-camera may only have overlapping fields of views with the micro-camera to its immediate left and right, for example, and no overlapping field of view with top and bottom neighbors. This configuration can offer large advantages in systems where the location region of interest is fixed in a given sample and unlikely to change over the operation of the instrument.

For example, for a configuration with a resolution of 10 um in the "X" or "Y" direction or the plane of a flat board, and in the "Z" direction the MCAM can discern between objects separated by 100 um within a 1 mm depth of field. This is especially important for the design of portable electronics which are moving toward increasingly smaller packages to pack more functionality in smaller spaces. For higher resolution in the "Z" axis, an interferometric capability may be added to get sub-micrometer resolution in the "Z" axis. And for increased fields of view along the axial "Z" axis, one of the refocusing methods mentioned above (e.g., mm-scale linear movement of the image sensor along Z, or a refocusing of an optical element within the imaging lens system) can be added. In this situation, multiple images may be taken at different "Z" axis locations of the MCAM (i.e., at different focus settings) and the images can be computationally reconstructed into 3D images via standard focal stack imaging procedures, or the images can be individually analyzed to extract useful inspection information.

There are also several alternatives to increase the depth of field. These include a shuttle to swap the lenses out for modifying the depth under focus, or the use of a vertical stage that moves the entire sensor array along the Z-direction, as opposed to each individual sensor, or via the use of liquid lenses within each imaging element, whose focusing power and can be tuned via an applied voltage, which accordingly will shift the focal plane of each of the imaging lens systems.

Since there are multiple images acquired by the MCAM system (e.g., one or more per micro-camera), a computer must be used to efficiently assemble the information acquired by separate images into a complete dataset or image, via the image analysis subsystem of the proposed invention. While doing this, the system can be further enhanced, with computational imaging algorithms to further improve the image compared to that acquired from a system taking a single snapshot of the desired area. Since the composite images that are derived are large and can be Gigabyte-sized images, the large amount of information that they contain can be analyzed and in particular the images can be analyzed with machine learning techniques. For example, it is common to utilize an algorithm to process the image to look for differences from a perfect product. Algorithms incorporating artificial intelligence and machine learning can be used to do this comparison task.

The camera sensors, lenses, specimen illumination (i.e., camera subsystem) and image post-processing algorithms (i.e., image analysis subsystem) together form a system and it has been shown that there is an optimum set of hardware conditions for any particular algorithm to maximize the performance of the tool. Thus, individual sensor settings may be modified and the lighting may be modified in response to the algorithm and the product being inspected. Additionally, the specific lenses used in the camera array may be optimized in a similar manner. There is no restriction posed on the array that states that each micro-camera unit must use a lens with near identical image forming characteristics. While it is convenient for humans to process well formed 2D images, machine learning algorithms do not necessarily need such well-formed images, and are not restricted to performing defect inspection on the raw data, however it may be acquired by the camera. Therefore, for rapid inspection, it may be beneficial to only acquire a subset of the data required for the formation of a human interpretable image if the machine learning algorithms can extract the relevant features.

Finally, other computational techniques can be used with the proposed invention, such as Fourier Ptychography, to obtain higher image resolution or measure the sample's phase properties, for example. Fourier Ptychography [NPL1] can increase the measurable resolution of the camera array by illuminating the sample with light originating from different sources. As each micro-camera forms an independent image, there is no need for the field of view of each camera to be illuminated from light originating from the same angle. Once array images are acquired, computational image recovery algorithms can then be used to recreate human readable images as well as to obtain the "phase" (nano-scaled relief) of the image. This is information that would otherwise be very challenging to obtain with a traditional imaging setup. Using the micro-camera array, all of this information can be acquired without a costly scanning stage.

In an alternate form, the fixed micro-camera array subsystem can be used in a non-rigid method to obtain at least two different views of the product. This technique allows the camera to be mounted in a simple holder that allows at least two different positions for the camera array to image the product. By taking two or more images with different perspective of the product, additional 3D data can be derived from a single camera array. This is not a scan and stitch approach to developing the image. Rather, it is a process of taking two or more images of the product from different locations. While a device to provide motion to move the camera array is required, the travel required by the motion device can be made much smaller than the entire field of view of the imaged field. This enables the optional motion device to be more lightweight and inexpensive with a very simple design.

In an alternative application, the MCAM can be located in devices such as an Equipment Front End Module ("EFEM") or a climate-controlled incubator to allow biological inspection to be done without removing the biological sample from its environmentally controlled space or for semiconductor wafer inspection on each and every wafer prior to entering and after exiting a production tool in the semiconductor manufacturing process. This ability to fit within a confined space is afforded by MCAM's ability to image large areas at high resolution without the need for motion subsystems, and motion controllers, and large mechanical supports.

EFEM's are used in semiconductor fabs to cleanly transfer wafers from transport modules into and out of semiconductor processing equipment. Several companies manufacture EFEM's such as Brooks Automation, Genmark, Fala Industries and others. The EFEM contains a wafer handling robot. Since the MCAM is small, it can be located inside an EFEM and the wafer may be moved to a location under the MCAM and imaged while the robot is holding the wafer. This can be done as the wafer is moved to or from the tool and into or out of the wafer carrier Front Opening Unit Pod ("FOUP"). This configuration can decrease the cost in a semiconductor fab for stand-alone defect inspection tools and increase the use of inspection at minimal cost in throughput. Since the MCAM' ability to image large areas at high resolution without any moving parts and in a compact form factors allows it to fit inside the EFEM, it can save valuable floor space in a fab. This is shown in example form in FIG. 5.

DESCRIPTION OF EMBODIMENTS

Figure 1:
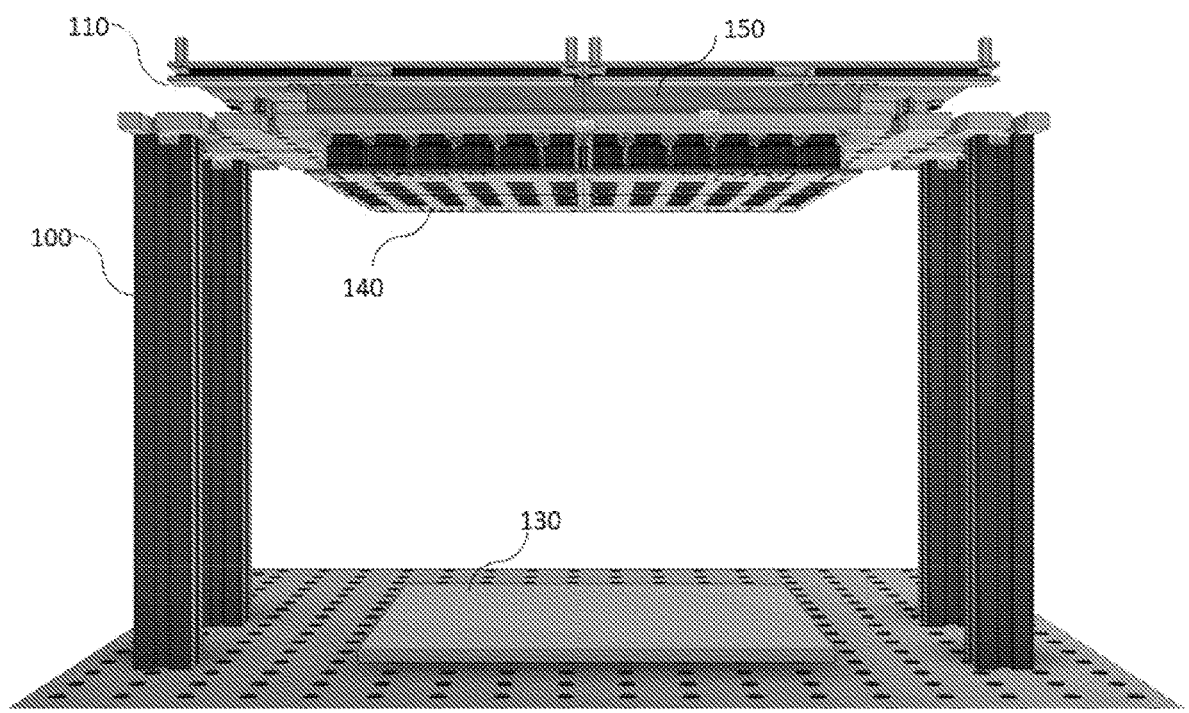
FIG. 1 shows the micro-camera array mounted to frame inspecting an item beneath it.

Disclosed are methods, apparatus, and systems that may provide an unscanned optical inspection system using a micro camera array. The system is comprised of one or more micro-camera units arranged together in a configuration such that the desired field of view (denoted by sample marked as (130) in FIG. 1) is covered. The sample is autonomously inserted under the field of view of the micro camera array. The illumination unit, sample insertion unit, and image acquisition unit are all controlled by a computer that synchronizes the various subsystems.

In some embodiments, which may be combined with any other embodiment, multiple micro-camera arrays may be used in conjunction with one and other to image the same sample from different angles.

In some embodiments, which may be combined with any other embodiment, the cameras within the micro camera array are arranged in a periodic arrangement.

In some embodiments, which may be combined with any other embodiment, certain or all cameras in the array may not contain overlapping fields of view with other cameras.

In some embodiments, which may be combined with any other embodiment, some or all of the image sensors may contain linear actuators to control the lateral translation of the sensor, the axial translation of the sensor along "Z", and the tilt of the sensor on a per sensor basis.

In some embodiments, which may be combined with any other embodiment, the micro-camera array may be outfitted with a translation stage and tilt stages that can control the 3D position and tilt the entire array.

In some embodiments, which may be combined with any other embodiment, the micro-camera array microscope may be placed in an environmentally controlled chamber to image samples within it.

In some embodiments, which may be combined with any other embodiment, a robotic arm or other robotic positioning tool, may position the sample under the microscope.

In some embodiments, which may be combined with any other embodiment, the illumination for the micro-camera array microscope may be integrated with the imaging module and placed in front of the lenses.

In some embodiments, which may be combined with any other embodiments, the illumination unit may be distributed or complementary to the integrated illumination in the micro-camera array.

In some embodiments, which may be combined with any other embodiment, the unprocessed data acquired by the microscopes may be saved for future processing.

In some embodiments, which may be combined with any other embodiments, the data may be processed by one or multiple processors to extract relevant information prior to saving this information.

In some embodiments, which may be combined with any other embodiments, the images acquired by the individual micro-cameras in the array may be combined to form a larger composite image of a larger portion of the sample.

In some embodiments, which may be combined with any other embodiments, the imaged object may be displaced between measurements so as to acquire images of the sample from different positions.

FIG. 1 shows the MCAM (110) mounted to a frame (100) and the inspected item, sample or specimen (130) located beneath the MCAM on the sample holder (120) in the imaged area (135) illuminated by an illumination unit (140). In alternate embodiments the MCAM could be mounted inside an environmental chamber to image biological samples, or could be mounted in an Equipment Front End Module ("EFEM") to image semiconductor wafers. The MCAM images over an entire field of view of width W, and length L to cover an area W×L, which approximately matches the size of the marked sample (130) in this diagram, but does not necessarily have to approximately match the size of the imaged sample.

The sample holder (120) may contain a stage to fine tune the position of the sample. Because the MCAM covers the entire field of view W×L, which is on the order of the size of the object, the travel of the stages contained in the sample holder will be much smaller than the desired field of view in at least 1 dimension.

Figure 2:
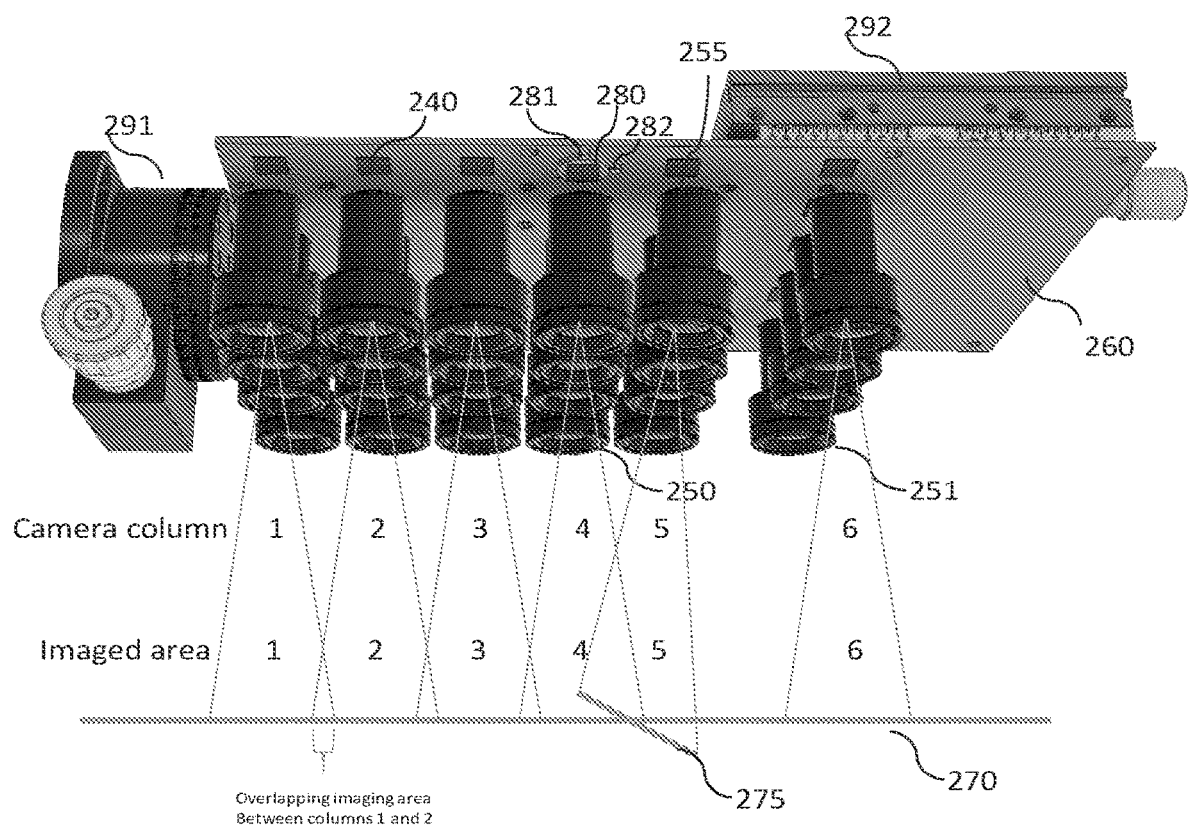
FIG. 2 shows a micro camera array with irregularly spaced sensors and actuators to control both the individual sensors, and the unit as a whole.

FIG. 2 shows the individual digital micro-cameras in the array may be regularly spaced lenses and sensors (250) or irregularly spaced lenses and sensors (251) so as to optimize the acquisition system for a given measurement. Each micro-camera consists of a sensor (240), which could be a CMOS image sensor, a CCD image sensor, a SPAD array, or similar image sensor, as well as an associated lens or group of lenses comprising a lens system (250, 251). In some embodiments, the lens/sensor system may be adjusted to provide focusing or refocusing. A steering device attached to each sensor (280) may be used to move each sensor axially to provide refocusing. Alternatively, or simultaneously, one or more of the micro-cameras' lens systems (250, 251) may include a refocusable optical element, whose position or focusing power can be electronically tuned to focus each micro-camera individually. The lenses may be fixed to the sensor using a small enclosing for each lens, or as a whole unit using a single linking plate as shown in FIG. 1 (150). Further, the camera subsystem may in some embodiments be steered to redirect the field of view using the steering device (280) with actuators (281 and 282). In some embodiments, the micro-camera array may be positioned and aligned as a whole unit (i.e., by re-positioning all sensors and/or lenses comprising the micro-camera array), using either manually or digitally actuated positioners (291 and 292). In FIG. 2, 24 cameras, arranged in 4 rows and 6 columns are shown. In the embodiment shown, columns 1 to 5 have overlapping imaging areas. In column 6 the acquired images do not overlap with images acquired in column 5. In some embodiments, the lenses might not be focused at the same imaging plane. This is shown in lens 255 where the focus plane of the image (275) is not collinear with the imaging plane for the other sensors shown as item 270. Such a configuration is known as a Scheimpflug configuration [NPL2]. The exact number of individual cameras is a function of the required resolution and required maximum field of view that is to be inspected on the product. For example, a PCB inspection tool that is designed to inspect PCB boards to 10 microns resolution and allow a maximum board size of 9 inches by 12 inches; the camera array may typically contain 70 or more separate micro-cameras each with each micro-camera unit containing a sensor with 10 or more megapixels. The individual cameras may be mounted on a specially designed printed circuit board (260). In a basic configuration, the individual cameras are arranged side by side in a 2D configuration so as to cover the entire field of view of the largest PCB that needs to be imaged by the machine. This configuration is similar to other inspection tools and not limited to PCB inspection tools. There is, in theory, no limit to the number of separate cameras that can be assembled to form an array and no limit as to the shape of the array in three dimensions. For example, in one arrangement the array is a simple flat rectangular layout of seven by ten separate cameras. In other applications the array may be circular in area or it may contain a third dimension where the cameras are located at different heights above the product and at different angles. This last configuration may prove to be important for wearable electronic manufacturing where the electronics need to conform to curved surfaces or for curved flat panel displays.

Figure 3:
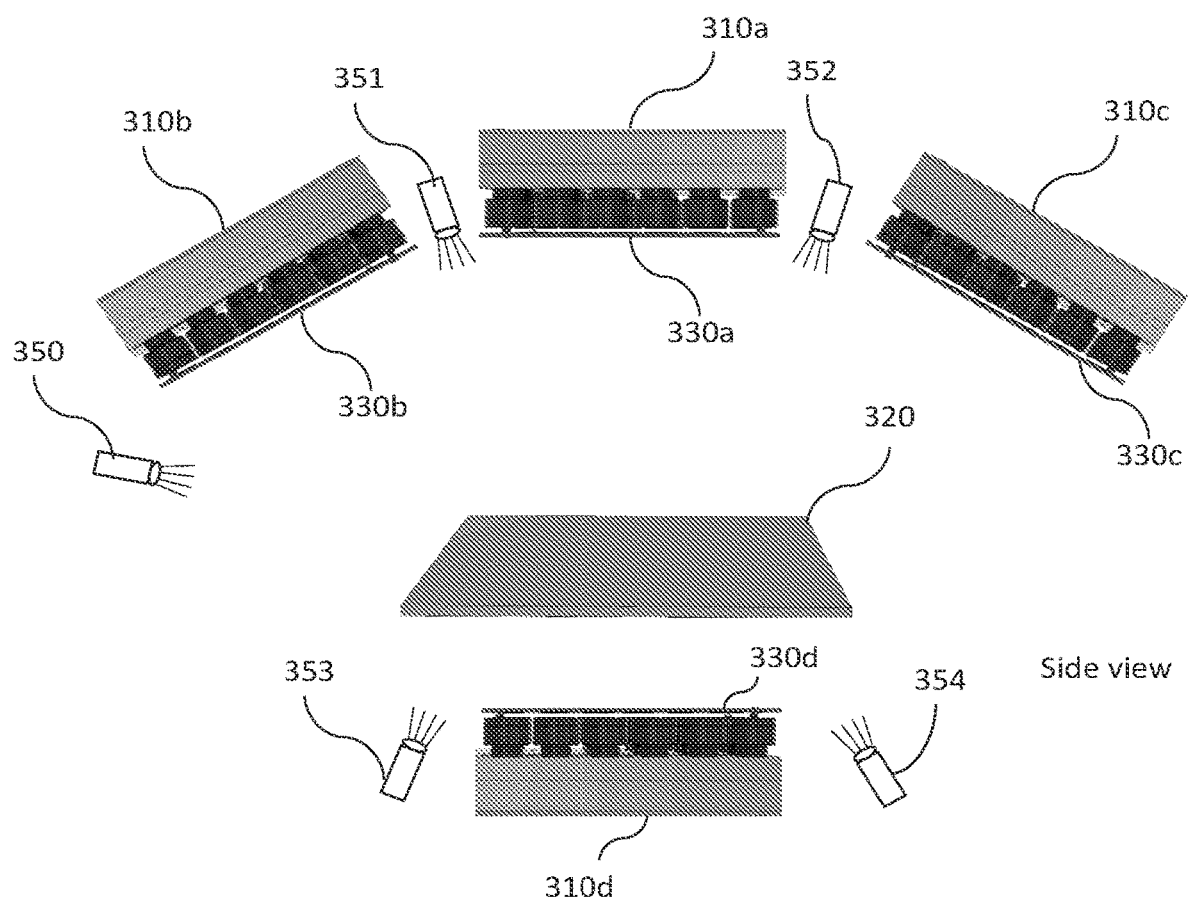
FIG. 3 shows how multiple micro camera arrays may be used together to image a sample from different angles.

FIG. 3 shows that for certain inspection tasks, multiple arrays (310a,b,c,d) may be used to image the product (320) from above, below and from the sides or at angles from the sides. Each array may be equipped with an illumination unit in front of the set of lenses (330a,b,c,d). The system may include one or more other illumination sources and optical elements to illuminate the sample from various angles with different patterns. These sources may be comprised of incandescent illumination sources, laser sources, LEDs or other electromagnetic sources (350, 351, 352, 353, 354) or a combination thereof.

Figure 4A:
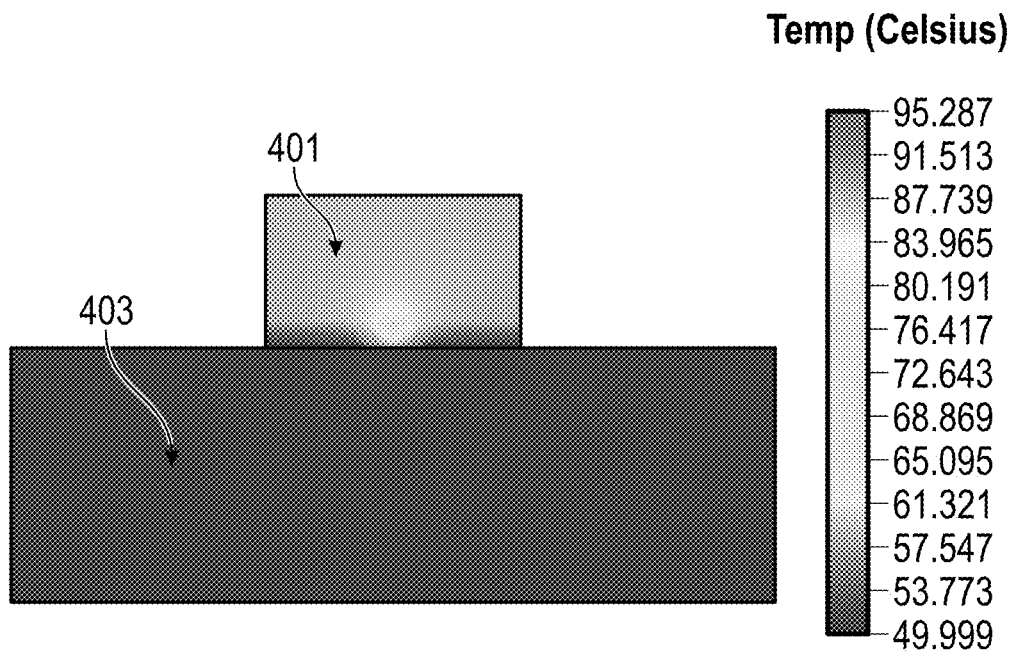
FIG. 4 shows how a transportation system can be integrated with the micro camera array to image a sample.
Figure 4B:
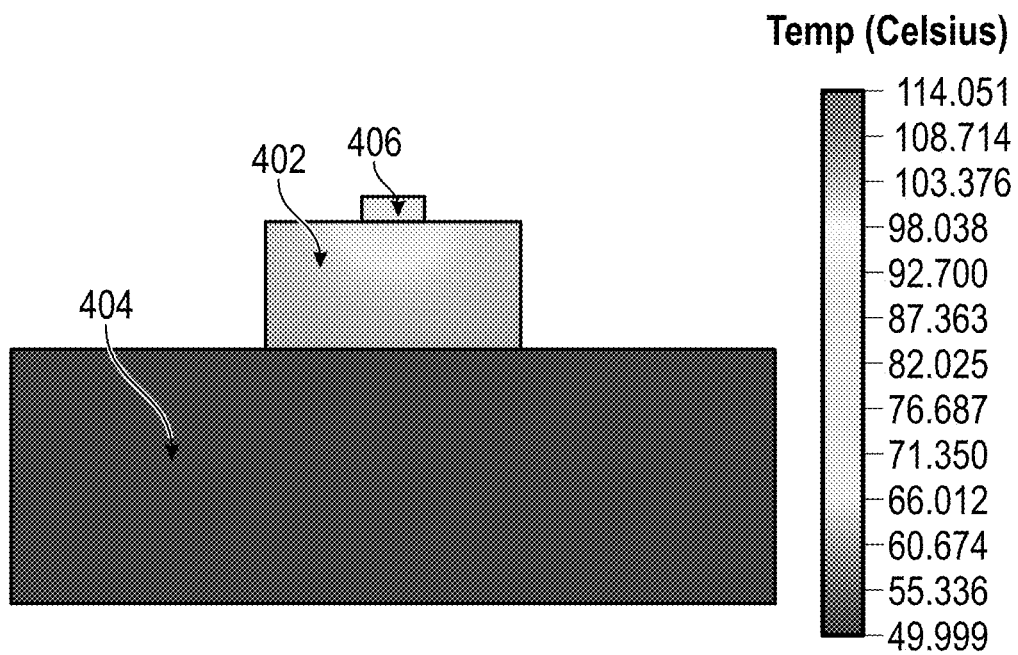

As shown in FIG. 4, For some embodiments a transport system (400) is included with the frame (100) such that the item (450) is transported on a web (410) that is moved and controlled by a motor (430) with the web or other flexible material rotating around rollers (420). Alternatively, the item (130) can be placed at the inspection zone by a robot or other handling device.

Figure 5:
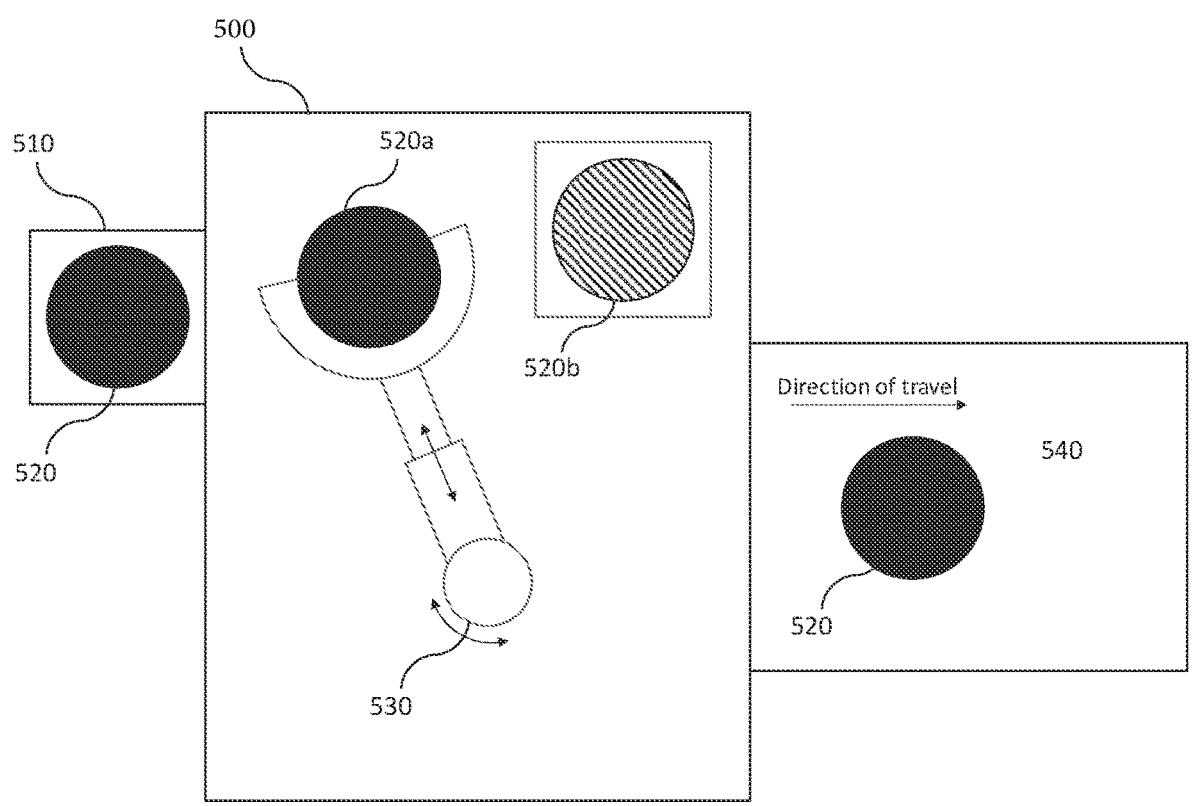
FIG. 5 shows the micro camera array within an environmentally controlled housing or inside an EFEM.

As shown in FIG. 5, it is the intention of the present invention that the MCAM can be positioned inside an enclosure to provide inspection in an enclosed space. FIG. 5 is an example of this in an Equipment Front End Module (EFEM) (500) where the Front Opening Unit Pod (FOUP) (510) is used to transport semiconductor wafers (520) in and around the fab and the EFEM robotic arm (530) moves the wafers from the FOUP into and out of the process tool (540). The MCAM (110) can be positioned inside the EFEM and the robot arm (530) can manipulate a wafer (520*a*), which is the same as an item to be inspected, to a position in proximity (520*b*) to the MCAM (110). The MCAM (110) is shown in arbitrary location in FIG. 5 but could be mounted in any of many locations and depending on each EFEM's design and use in an optimum location to minimize total cost of ownership. Similarly, the MCAM can be mounted in a biological environmental chamber with or without a transfer mechanism to inspect temperature controlled biological samples.

Figure 6:
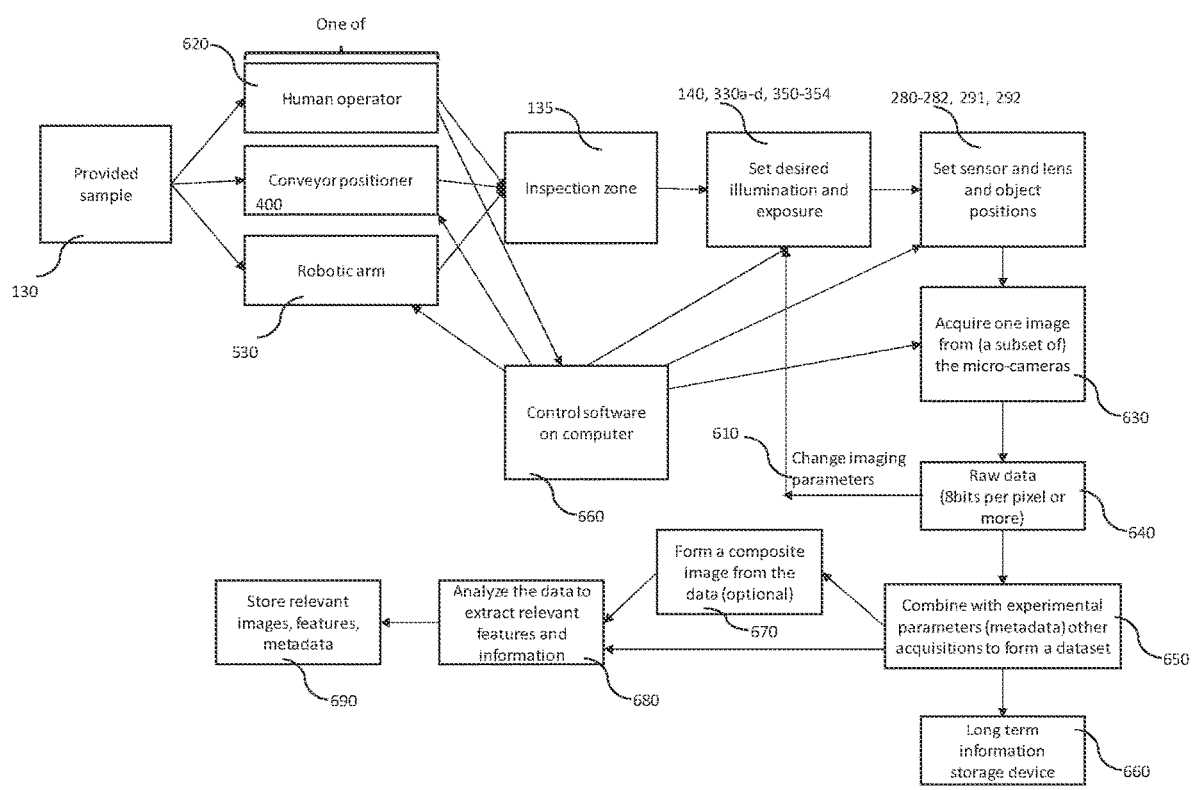
FIG. 6 shows a preferred workflow for how images are acquired analyzed, and how the relevant data is stored.

FIG. 6 shows a preferred workflow. The provided sample (130) is first brought in proximity to the MCAM. The MCAM imaging system may either be operated by a human operator or the operation may be fully or partially automated by a computer control system (660). A human operator (620) or, as is in the case for PCB boards, a conveyor position, or in the case of an EFEM, a robotic arm may bring the sample into the inspection zone (135) of the MCAM. In the case that a human operator is interacting directly with the sample, they may also provide some input of the compute during the acquisition to control the position, illumination, or other settings of the acquisition. The desired illumination (140, 330*a-d*, 350-354) and exposure of the micro-cameras are then set. For the case that individual sensors and lens positions can be set, these positions (280-282, 291, 292) may be chosen at this time. A subset or all of the cameras in the camera array will then take an image (630), to provide approximate a gigapixel or more of raw data from the images. The raw data corresponds to the per-pixel information provided by each imaging sensor. Typically, this is of the form of 8-12 bits per pixel but can be more or less along with when this information was acquired. To form a dataset, multiple such acquisitions can be obtained (610) by changing the illumination and sensor, lens, and object position. The metadata of each raw data consists of a unique identifier for the imaged object, the illumination and position settings, as well as any other relevant information about the imaging environment such as the date, temperature, last service date. One or more sets of raw data, along with their metadata, make up a single dataset (650). This dataset may be immediately sent to another computer for long term storage (660) on hard drives, solid state drives, tape backups, or any other form of long term storage. Alternatively, the dataset may be sent for online processing (670, 680) to form a composite image and to extract relevant features from the images. Finally, after on-line analysis, the composite images, relevant features, and/or the raw data along with the metadata can be stored in long term storage.

To find relevant features in acquired images two general strategies can be undertaken. For general objects, these can be compared to other objects previously imaged or to a predetermined model for the object. This is beneficial since over time a model of the prime object can be formed and small differences from the prime object can be picked up by the MCAM. Alternatively, for repetitive objects such as chips, differences between adjacent chips can be taken. This has the advantage that the objects being compared will be made at very similar times, and will be observed under the same conditions. This kind of analysis does not require large data storage for the analysis since all analysis can be accomplished with data found in a single dataset.

Figure 7:
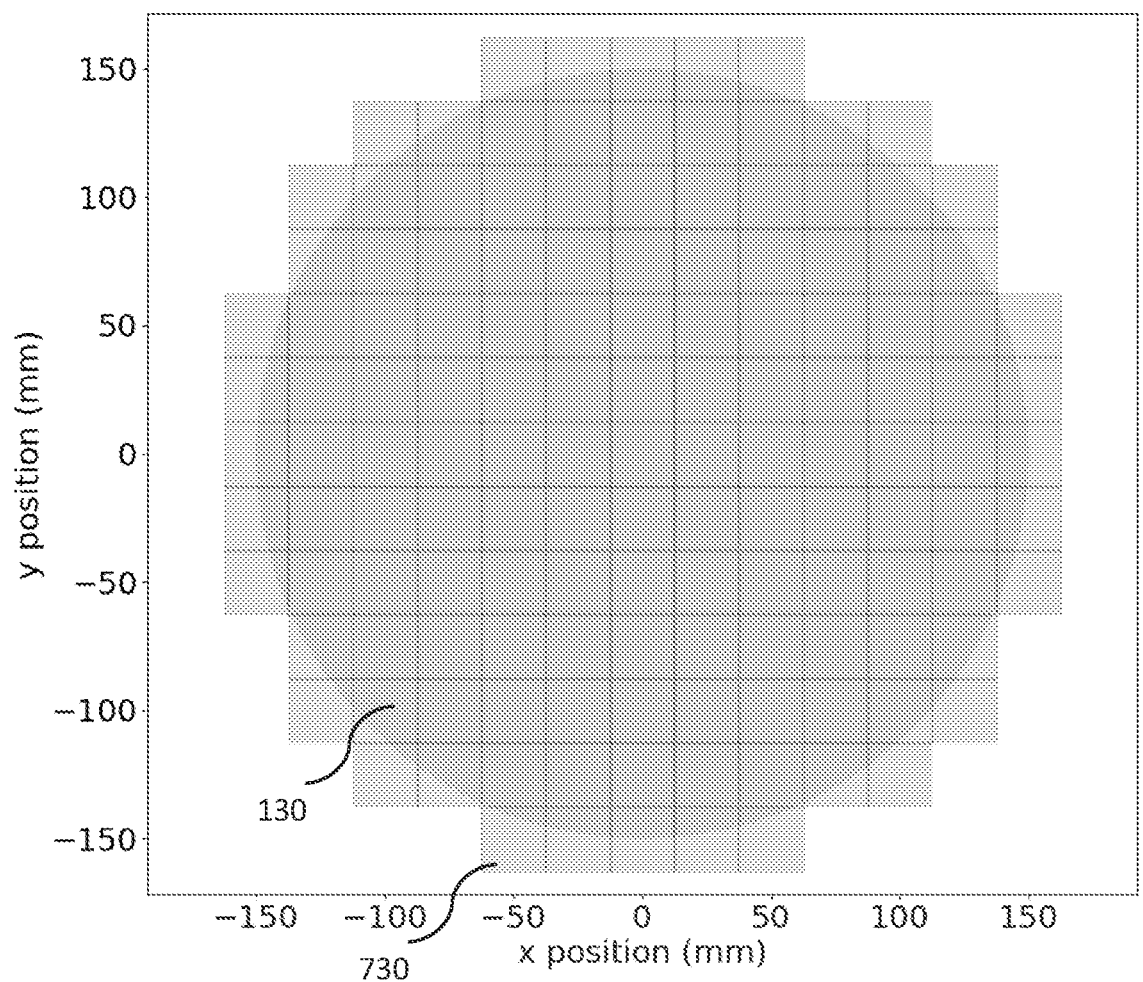
FIG. 7 shows a periodic tiling arrangement of micro-cameras each shown to image an area of 25×25 mm to cover a 300 mm wafer using 137 cameras.

FIG. 7 shows an arrangement of 137 micro cameras that can be used to image an entire 300 mm wafer (130). Here each camera is assumed to image an area larger than the drawn squares each 25×25 mm in size. Cameras located on the periphery of the wafer may only have relevant information in a small portion of their field of view. One such camera, highlighted as item 730, only measures relevant information in one corner of the field of view.

Figure 8:
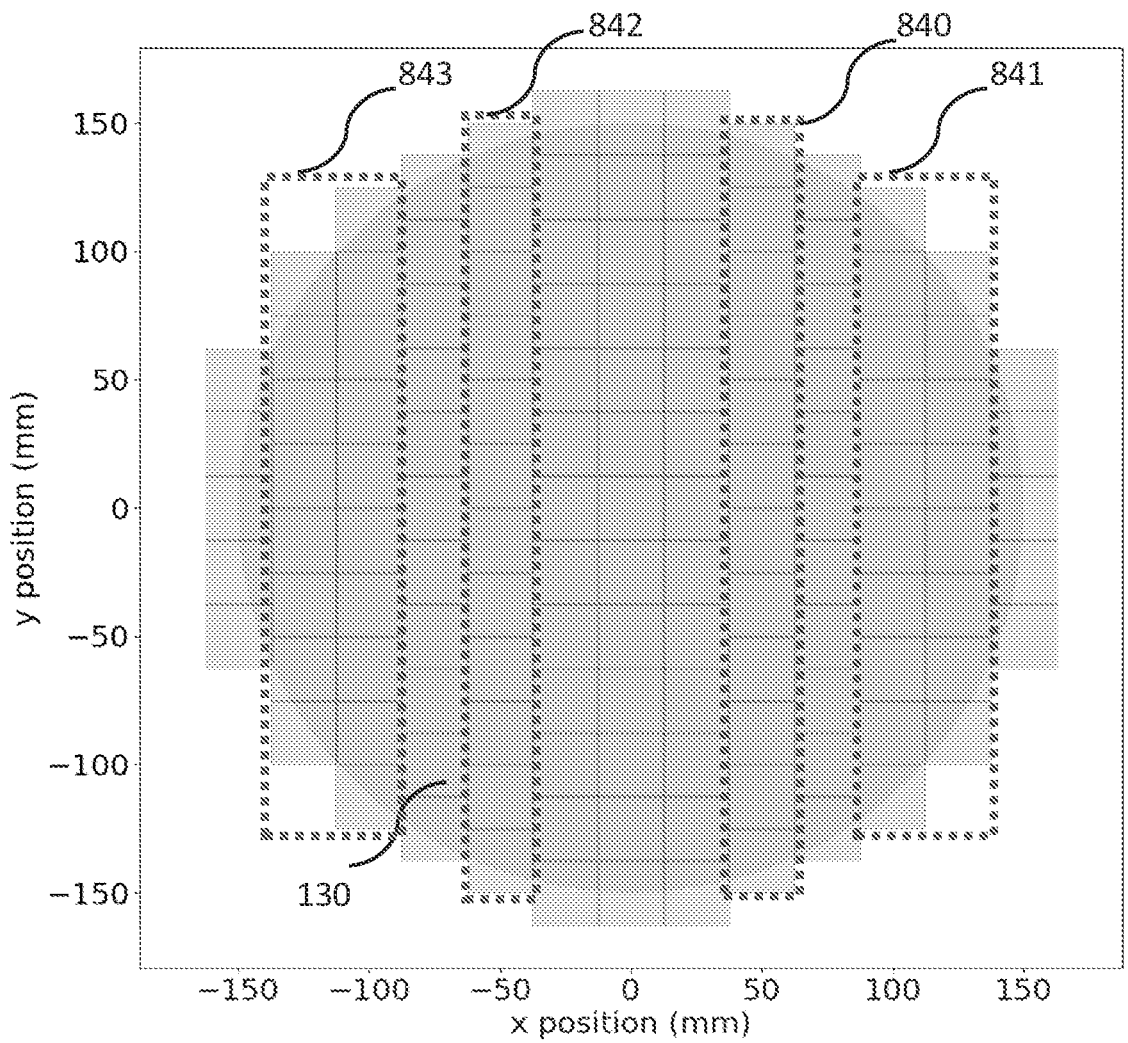
FIG. 8 shows an aperiodic tiling arrangement of micro-cameras each shown to image an area of 25×25 mm to cover a 300 mm wafer using 131 cameras.

FIG. 8 shows how one embodiment of the micro-camera array imager can make use of the known shape of the sample to reduce the number of cameras used in the system. This particular embodiment shifts cameras in a few columns (columns 840-843) so as to image the same sample (item 130) but with 131 micro-cameras instead of the 137 micro-camera system shown in FIG. 7.

Figure 9:
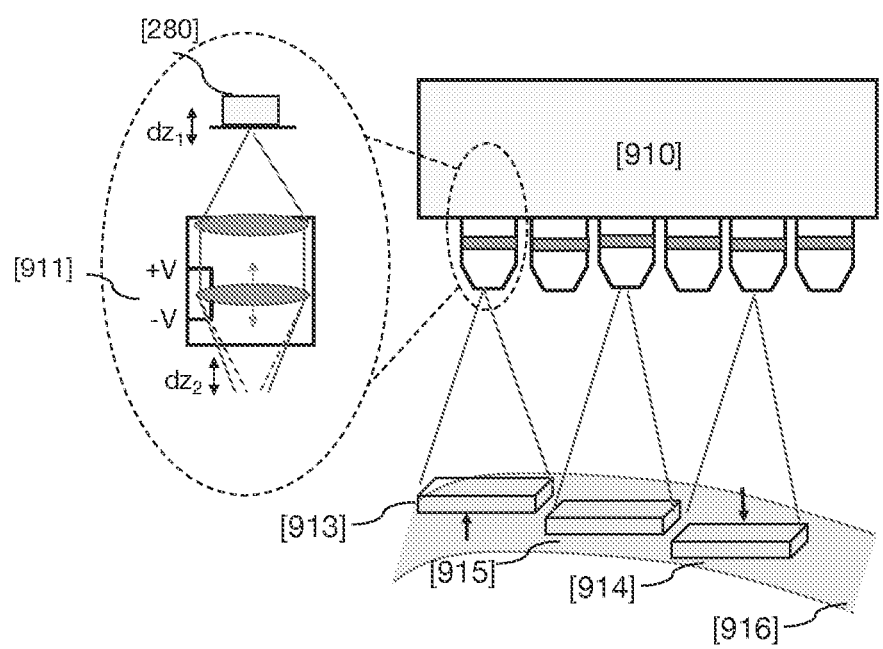
FIG. 9 shows how different micro-cameras within the array can be re-focused at different axial planes within the sample to enable single-snapshot acquisition of an in-focus image across a large field-of-view without any required scanning stages or motion subsystems.

FIG. 9 shows a micro-camera array imager (910) with individual micro-cameras that are focused at different axial planes to image a curved item or sample, in-focus, in a single snapshot. The focal plane of each micro-camera can be brought closer to (913) or further from (914) the focal plan of adjacent micro-cameras (915) to ensure that the curved sample (916) is in-focus beneath each micro-camera. The MCAM includes at least 2 mechanisms to achieve this. First, a sensor steering device (280) may be used to re-position each sensor along "Z" by a distance dz1. Alternatively, a liquid lens within each micro-camera lens system (911) may be used to alter the focal properties of the lens to shift the focus by an axial distance dz2. The lens element in (911) may also be moved or re-positioned along "Z" by a steering device as well, to enable refocusing.

Examples

Here we provide 4 example embodiments: the first for imaging PCB over an area as large as 9×12 inches. The second and 3rd are designed to image wafers 12 inches (300 mm) in diameter. The fourth example is specifically designed for imaging biological samples located in 96 well plate configuration. For brevity, all imaging systems describe herein have 10 um resolution. For a lens with a 25 mm focal length, an f/# of 2.5, and a focal plane 225 mm away from the pupil of the lens, the system will have a magnification of 0.8×. If a 20 megapixel imaging sensor is used in each micro-camera (1 um pixel size, 5216×3896 arrangement in each sensor), then each micro camera will image an area of 41.6×31.2 mm at the imaging plane.

To image a continuous area of 9×12 inches, (approximately 228.6×304.8 mm), one would be required to tile 10×13 sensors each separated by 25 mm. For one snapshot acquisition of the system, assuming 8 bits are detected per image sensor, this corresponds to 2.6 gigabytes (i.e. gigapixels) per snapshot).

To image a circular area, 300 mm in diameter, a periodic arrangement of 137 cameras are required to tile the entire area as shown in FIG. 7.

To image the same circular area, 300 mm in diameter, a periodic arrangement of 131 cameras can be used to tile the entire area. Such an arrangement is shown in FIG. 8. This arrangement takes advantage of the known shape of the sample to optimize the placement of micro-cameras.

To image biological samples contained in a 96 well plate configuration, typically 5 inches (125 mm) by 3.25 inches (82 mm), one may require a tiled arrangement of the micro-cameras system described above consisting of 5×4 micro-cameras for a total of 20 micro-cameras.

INDUSTRIAL APPLICABILITY

The invention has been explained in the context of several embodiments already mentioned above. There are a number of commercial and industrial advantages to the invention that have been demonstrated, including the ability to image an unbounded FOV at high resolution. Two additional examples of industrial applications not previously mentioned that may benefit from the described invention are automotive manufacturing and food inspection facilities.

While the invention was explained above with reference to the aforementioned embodiments, it is clear that the invention is not only restricted to these embodiments, but comprises all possible embodiments within the spirit and scope of the inventive thought and the following patent claims.

CITATION LIST

Patent Literature

[PTL1]: L. Markwort et al (Nanda Technologies), Optical inspection system and method, U.S. Pat. No. 8,368,881

[PTL2]: M. P. Asar (Lucent Technologies), Vision comparison inspection system graphical user interface, U.S. Pat. No. 6,477,266

[PTL3]: A. K. Kalnajs et al (DaimlerChrysler), Machine vision image data acquisition system, U.S. Pat. No. 5,880,772

[PTL4]: J. B. Burnett (Teradyne), Lighting arrangement for automated optical inspection system, U.S. Pat. No. 6,850,637

[PTL5]: D. W. Raymond et al (Landrex Technologies), Optical inspection system, U.S. Pat. No. 7,075,565

[PTL6]: J. K. Hong et al (Koh Young Technology), Board inspection apparatus using multiple cameras, U.S. Pat. No. 9,046,498

[PTL7]: S. K. Case (CyberOptics), High speed distributed optical sensor inspection system, U.S. Pat. No. 8,872,912

[PTL8]: S. K. Case (CyberOptics), High speed optical inspection system with camera array and compact, integrated illuminator, U.S. Pat. No. 8,670,031

[PTL9]: C. E. Haugan et al (CyberOptics), Dark field illuminator with large working area, U.S. Pat. No. 8,894,259

[PTL10]: Horstmeyer et al, Unscanned Optical inspection system using a micro camera array, Provisional Patent Application 62/315,037

[PTL11]: L. K Fisher et al (CyberOptics), Gantry position tracking using redundant position sensors, U.S. Pat. No. 8,116,909

[PTL12]: P. Osterlund et al, Method of self calibrating a positioning system for positioning an element in a working space, U.S. Pat. No. 7,853,352

[PTL13]: E. J. C. Bos, Precision stage, U.S. Pat. No. 8,091,243

[PTL14]: J. K. Jeong et al (Koh Young Technology), Board inspection apparatus and method, U.S. Pat. No. 9,470,752

[PTL15]: B. R Spady et al (Nanometrics), Metrology/inspection positioning system, U.S. Pat. No. 7,295,314

[PTL16]: J. Salafsky et al (Biodesy), Systems and methods for high throughput analysis of conformation in biological entities, U.S. Pat. No. 9,989,534

[PTL17]: E. P. Rudd et al (Cyberoptics), Rapid-firing flashlamp discharge circuit, U.S. Pat. No. 6,593,705

[PTL18]: T. A. Skunes et al (Cyberoptics), Inspection system with vibration resistant video capture, U.S. Pat. No. 6,549,647

[PTL19]: D. Fishbaine et al (Cyberoptics), Solder paste inspection system, U.S. Pat. No. 6,750,899

Non-Patent Literature

[NPL1] G. Zheng et. al, "Wide-field, high-resolution Fourier ptychographic microscopy," Nature Photonics Volume 7, pages 739-745 (2013)

[NPL2] H. M. Merklinger. Focusing the View Camera. Bedford, Nova Scotia: Seaboard Printing Limited. ISBN 0-9695025-2-4 (1996).

What is claimed is:

1. An inspection system comprising
a digital camera subsystem,
   wherein the digital camera subsystem comprises an array of multiple micro-cameras,
   wherein each micro-camera comprises a digital image sensor and a lens system that is configured to image a fraction of an item at an image resolution of 20 micrometers or smaller, and
   wherein the digital camera subsystem is configured to detect optical radiation over a field-of-view of 100 mm or more in a diagonal dimension in a single snapshot;
an image analysis subsystem to process image data acquired by the digital camera subsystem,
wherein at least a micro-camera within the digital camera subsystem contains one or more refocusing mechanisms,
wherein the one or more refocusing mechanisms are configured to shift the plane of focus of the micro-camera between two consecutive snapshots,
wherein the one or more refocusing mechanisms are configured to shift the plane of focus of the micro-camera to allow the array of micro-cameras to capture an image of the item with portions of the image having different planes of focus.

2. The system of claim 1, further comprising
a frame configured for supporting the item,
wherein the frame comprises actuators,
wherein the actuators are configured to move the item with a moving distance not more than the entire field of view of the digital camera subsystem.

3. The system of claim 1,
wherein each micro-camera comprises a digital image sensor and a lens system that is configured to image a fraction of the item at an image resolution of 10 micrometers.

4. The system of claim 1,
wherein each micro-camera comprises a digital image sensor and a lens system that is configured to image a fraction of the item at an image resolution of less than 5 micrometers.

5. The system of claim 1,
wherein the digital camera subsystem is configured to detect optical radiation over a field-of-view of 8 cm×12 cm in a single snapshot.

6. The system of claim 1,
wherein the at least a micro-camera is coupled to mechanical actuators to control an angle of tilt, a lateral translation and or an axial translation of the digital image sensor or the lens system so that at least two micro-cameras comprises different planes of focus.

7. The system of claim 1,
wherein the at least a micro-camera is coupled to mechanical actuators to control an angle of tilt, a lateral translation or an axial translation of the digital image sensor or the lens system to allow the array of micro-cameras to capture images with different planes of focus.

8. The system in claim 1,
wherein the digital image sensors or the lens systems of the multiple micro-cameras are configured to be individually tilted or translated to optimize their viewing angle of the inspected item,
wherein the camera subsystem is configured to be steered and aligned as a whole unit.

9. The system in claim 1,
wherein the digital camera subsystem comprises multiple arrays of multiple micro-cameras,
wherein the multiple arrays are disposed above, below, from sides, or at different angles from the sides of the item.

10. The system in claim 1,
wherein the array of the multiple micro-camera image sensors is mounted on a printed circuit board.

11. The system in claim 1,
wherein the digital camera subsystem comprises an illumination unit,
wherein the illumination unit is coupled to the digital camera subsystem to be an integrated part of the digital camera subsystem.

12. The system in claim 1,
wherein the digital camera subsystem is mounted on a motion apparatus,
wherein the motion apparatus is configured to move the digital camera subsystem to multiple viewing angles to capture images above and from opposite sides of the inspected item.

13. The system of claim 1,
wherein images acquired by the multiple micro-cameras are processed to provide a 3D view of the inspected item.

14. The system in claim 1,
wherein the image analysis subsystem comprises one or more computational processors to process the images acquired from the multiple digital image sensors to extract relevant features comprising defects, or to detect a sample depth map, or to optimize detected image information for a particular viewing purpose either by a human operator or another computer algorithm.

15. The system in claim 1,
wherein the inspection system is located inside an Equipment Front End Module (EFEM),
wherein the inspection system is configured to inspect wafers supported by a robotic arm during a transfer between a Front Opening Unit Pod (FOUP) and a process chamber.

16. The system in claim 1,
wherein the inspection system is located inside a biological environmental chamber to inspect temperature controlled biological samples.

17. The system in claim 1,
wherein the inspection system is disposed in a vicinity of a transparent or semi-transparent optical window for inspecting the item through the transparent or semi-transparent optical window.

18. An inspection system comprising
a digital camera subsystem,
  wherein the digital camera subsystem comprises an array of multiple micro-cameras mounted on a printed circuit board,
  wherein the digital camera subsystem is configured to be steered and aligned as a whole unit,
  wherein each micro-camera comprises a digital image sensor and a lens system that is configured to image a fraction of the item at an image resolution of 20 micrometers or smaller,
  wherein the image sensors or lens systems of the multiple micro-cameras are configured to be individually tilted or translated,
  wherein each image sensor or lens system is configured to be focused at an independently selected location on the item,
  wherein the digital camera subsystem is configured to detect optical radiation over a field-of-view of 100 mm or more in a diagonal dimension in a single snapshot.

* * * * *